No. 809,830. PATENTED JAN. 9, 1906.
H. S. MILLER.
SCREEN FOR PHOTOGRAPHIC CAMERA LENSES.
APPLICATION FILED MAY 6, 1904.
2 SHEETS—SHEET 2.
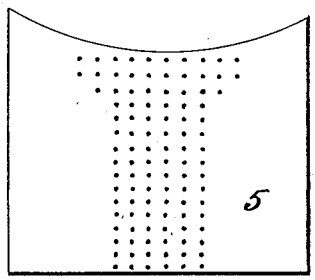
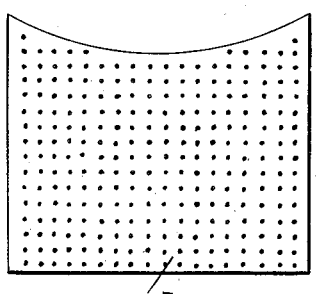
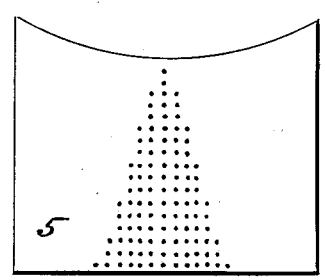
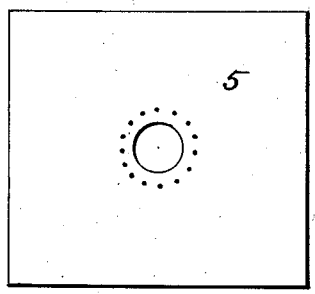
Witnesses:
W. H. Durand.
Arthur W. Crossley.
Inventor:
Henry S. Miller
By Louis Bagger & Co.
Attorneys.

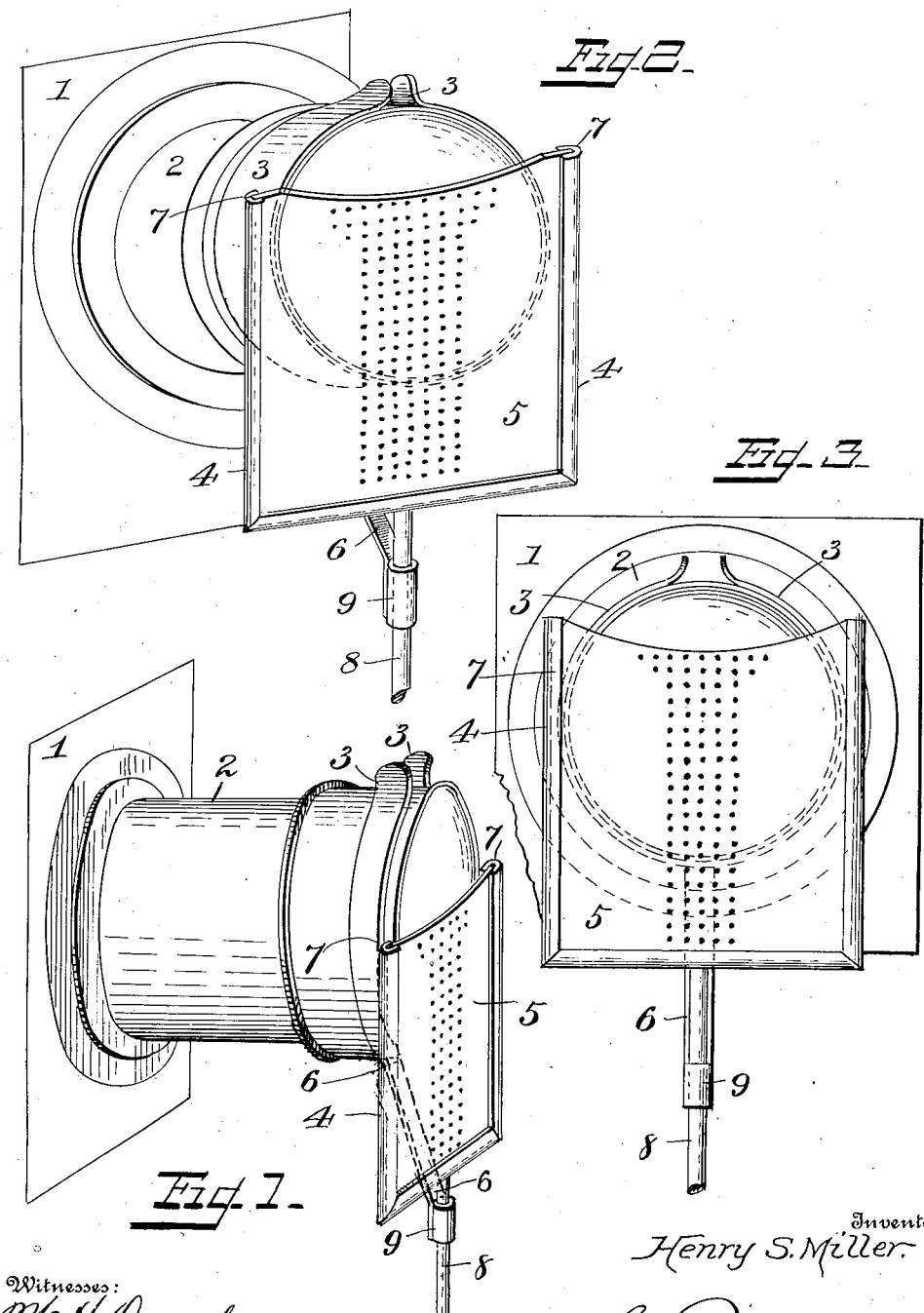

UNITED STATES PATENT OFFICE.

HENRY SAMUEL MILLER, OF FOND DU LAC, WISCONSIN.

SCREEN FOR PHOTOGRAPHIC CAMERA-LENSES.

No. 809,830.　　　　Specification of Letters Patent.　　　　Patented Jan. 9, 1906.

Application filed May 6, 1904. Serial No. 206,753.

*To all whom it may concern:*

Be it known that I, HENRY SAMUEL MILLER, a citizen of the United States, residing at Fond du Lac, in the county of Fond du Lac and State of Wisconsin, have invented new and useful Improvements in Screens for Photographic Camera-Lenses, of which the following is a specification.

This invention has relation to the art of photography; and it has for its objects the provision of a method and means whereby the light or the effects of light upon a picture may in the act of exposure be broken up or controlled over a part or the whole of the picture, or, in other words, the provision of a method or means whereby the light may be controlled so as to be retarded, as it were, over a part or parts of the picture without interfering with a full exposure of the balance with the results that will be explained hereinafter.

In carrying the invention into effect I employ screens of the character presently described, one or more at a time, before a photographic lens and connect or adjust them in place as circumstances may require. The form or constructive character of the means being so variable and the manner of attachment or adjustment being such that ordinary mechanical skill may readily devise means to suit varied needs, it is difficult, if not almost impossible, to illustrate a form of device best suited for supporting the screens before the lens. Still in order that my invention may be made clear I have shown a device for the purpose mentioned, even though the device as shown may not be as well adapted for such purpose as some other form or device. My claim for invention relates to the screens before the lens and not to any particular mechanical means for holding such screens.

In the drawings, Figure 1 represents a portion of a camera and lens and support equipped with a screen-support and screen, the latter being adjusted in downward position. Fig. 2 is a view similar to Fig. 1, the screen being adjusted in higher position. Fig. 3 is a front view; and Figs. 4 to 7, inclusive, are views suggesting different arrangements of the perforations of the screens.

In the example herein illustrated the camera 1 has the usual lens-holder 2, and upon the latter is sprung or applied a clasp 3, from the lower surface of which extends downward and forward a suitable distance an arm 6, equipped with a sleeve 9, the function of which will be presently apparent.

A holder 4, preferably rectangular in general outline and adapted to receive thereinto through its upper open portion the screens 5 and provide for suitably holding the same, has fixed centrally to its bottom edge a preferably rod-like handle 8, inserted into and sustained in position by the sleeve 9, and whereby said holder, with the screen placed therein, may be adjusted with relation to the lens-holder as circumstances require.

The screens, as shown, are provided with different arrangements of perforations to adapt them to variously control the light on various pictures. The screens shown in Figs. 4 to 7, inclusive, have each a different arrangement of perforations to be partly or entirely within the range of the lens for the purpose of breaking up or controlling the rays of light striking through that portion of the lens covered by the perforated screens, causing a diffusion and retardation of the light on all of the picture as desired, placing the highest lights where most desired and retarding locally the exposure of light on any portion of the picture according to the arrangement of perforations in the screens used.

It is here noted that in the use of my perforated screen such screen does not cover but freely admits the light to and fully develops such portions of the picture as require the greater amount of exposure—as, for instance, the face and the like—which it may be desired to disclose therein, while the light is restrained by the use of the perforated screen from the portions of the picture which ordinarily receive too intense an exposure—such, for instance, as white lacework, white dresses, draperies, and the like. While to a certain extent a diffusion of light results from the use of this invention on such portions of the picture as have been retarded in exposure, nevertheless the invention is not primarily intended or claimed as a diffuser such as would result from the use of a semitransparent screen covering the whole of the exposure.

It will be seen from the foregoing that the invention consists in restraining or modifying the exposure of a plate or those portions of a plate which ordinarily receive too intense an exposure—such as white waists, skirts, draperies, &c.—in portraits. The invention is indeed intended principally for portrait work.

Referring to the drawings, a perforated screen 5, best suited to the particular picture being taken, will be slid into place in the holder 4, and then by taking hold of the handle 8 the user may slide the screen in accordance with the natural light upon the picture, so as to deliver the same in proper intensity at points where required in order that the picture will be of a substantially perfect character when produced, needing little, if any, retouching, and in any event producing a picture of improved effect.

My invention is not to be confounded with the art of vignetting in which the pictures are produced having merely no sharply-defined boundary-lines.

I claim—

1. A foraminous screen effective for the full exposure of the lenses or their exposure to a modified degree for the purpose set forth.

2. The combination with a photographic camera-lens of a screen having an opaque surface or area and provided with numerous perforations produced directly therein in pyramidal form or outline, in the line of the lens.

In testimony whereof I have signed my name to this specification in the presence of two subscribing witnesses.

HENRY SAMUEL MILLER.

Witnesses:
F. W. CHADBOURNE,
W. E. GRISWOLD.